(12) United States Patent
Henrich et al.

(10) Patent No.: US 8,821,692 B2
(45) Date of Patent: Sep. 2, 2014

(54) METHOD FOR THE RAPID PYROLYSIS OF LIGNOCELLULOSE

(75) Inventors: Edmund Henrich, Dettenheim (DE);
Friedhelm Weirich, Neuthard (DE);
Eckhard Dinjus, Leimersheim (DE)

(73) Assignee: Karlsruher Institut fuer Technologie, Karlsruhe (DE)

( * ) Notice: Subject to any disclaimer, the term of this patent is extended or adjusted under 35 U.S.C. 154(b) by 467 days.

(21) Appl. No.: 12/063,516

(22) PCT Filed: Jun. 22, 2006

(86) PCT No.: PCT/EP2006/005985
§ 371 (c)(1),
(2), (4) Date: Feb. 11, 2008

(87) PCT Pub. No.: WO2007/017005
PCT Pub. Date: Feb. 15, 2007

(65) Prior Publication Data
US 2010/0163395 A1    Jul. 1, 2010

(30) Foreign Application Priority Data

Aug. 11, 2005  (DE) .......................... 10 2005 037 917

(51) Int. Cl.
*C10B 49/16*       (2006.01)
*C10B 53/02*       (2006.01)
*C10B 49/20*       (2006.01)
*C10C 5/00*        (2006.01)

(52) U.S. Cl.
CPC ................. *C10B 49/16* (2013.01); *C10B 49/20* (2013.01); *C10B 53/02* (2013.01); *C10C 5/00* (2013.01); *Y02E 50/14* (2013.01)
USPC .................... 201/12; 201/8; 201/32; 585/242

(58) Field of Classification Search
CPC .......... C10B 49/16; C10B 49/18; C10B 53/02
USPC .................... 201/2.5, 7, 8, 12, 25, 32, 33, 42; 202/99, 118; 585/242; 432/27, 215
See application file for complete search history.

(56) References Cited

U.S. PATENT DOCUMENTS 1,712,082 A  *  5/1929  Koppers .......................... 201/12
2,983,653 A  *  5/1961  Danulat et al. ................. 202/118
(Continued)

FOREIGN PATENT DOCUMENTS

CA          2351892       12/2002
DE         69308884       11/1997
(Continued)

OTHER PUBLICATIONS

Translation of E. Henrich et al., "Flugstromvergasung von fluessigen Pyrolyseprodukten bei hohem Druck: Ein neues Konzept zur Biomassevergasung", Dgmk-Tagungsbericht, Hamburg, Germany, vol. 22, No. BIB 24, Apr. 2002, pp. 95-102, XP001126938. (22 pages included in translation).*

(Continued)

Primary Examiner — Jill Warden
Assistant Examiner — Joye L Woodard
(74) Attorney, Agent, or Firm — Leydig, Voit & Mayer, Ltd.

(57) ABSTRACT

Method for fast pyrolysis of lignocellulose including: mechanically comminuting the lignocellulose to lignocellulose particles; at least one of completely drying and preheating the lignocellulose particles; mixing the lignocellulose particles with heat transfer particles so as to provide a mixture; heating the heat transfer particles, prior to the mixing, to a temperature between 500° C. and 650° C.; and heating, in a pyrolysis reactor with oxygen excluded, the lignocellulose particles using the heat transfer particles so as to establish a temperature between 400° C. and 600° C. for 1 to 50 seconds and so as to react the lignocellulose particles so as to provide pyrolysis coke, pyrolysis condensate, and pyrolysis gas.

20 Claims, 2 Drawing Sheets

(56) References Cited

U.S. PATENT DOCUMENTS

| | | | | |
|---|---|---|---|---|
| 2,984,602 | A | * | 5/1961 | Nevens et al. .................. 201/7 |
| 3,298,928 | A | * | 1/1967 | Esterer .............................. 201/4 |
| 3,350,280 | A | * | 10/1967 | West ................................ 201/12 |
| 3,414,480 | A | * | 12/1968 | Stotler et al. ................... 201/15 |
| 3,852,048 | A | * | 12/1974 | Pyle ................................ 48/209 |
| 3,929,585 | A | * | 12/1975 | Grimmett ...................... 201/2.5 |
| 4,070,250 | A | * | 1/1978 | Choi .............................. 208/411 |
| 4,160,719 | A | * | 7/1979 | Pollock ......................... 208/411 |
| 4,436,588 | A | * | 3/1984 | Rammler et al. ............... 201/12 |
| 4,568,362 | A | | 2/1986 | Deglise et al. |
| 4,704,138 | A | * | 11/1987 | Smith ............................ 201/12 |
| 5,605,551 | A | | 2/1997 | Scott et al. |
| 2004/0208969 | A1 | * | 10/2004 | Holzschuh et al. .......... 426/534 |

FOREIGN PATENT DOCUMENTS

| | | |
|---|---|---|
| DE | 10151054 | 4/2003 |
| EP | 1354172 | 10/2003 |
| GB | 793518 | 4/1958 |

OTHER PUBLICATIONS

E. Henrich et al., "Flugstromvergasung von fluessigen Pyrolyseprodukten bei hohem Druck: Ein neues Konzept zur Biomassevergasung", DGMK-Tagungsbericht, Hamburg, Germany, vol. 22, No. BIS 24, Apr. 2002, pp. 95-102, XP001126938.

* cited by examiner

METHOD FOR THE RAPID PYROLYSIS OF LIGNOCELLULOSE

CROSS REFERENCE TO RELATED APPLICATIONS

This is a U.S. national phase application under 35 U.S.C. §371 of International Patent Application No. PCT/EP2006/005985, filed Jun. 22, 2006, and claims benefit of German Patent Application No. 10 2005 037 917.6, filed Aug. 11, 2005. The International Application was published in German on Feb. 15, 2007 as WO 2007/017005 A1 under PCT Article 21(2).

FIELD

The invention relates to a method for fast pyrolysis of lignocellulose. The method is a constituent of a method chain for generating synthesis gases from biomass such as lignocellulose, i.e. cellulose- and lignin-containing substances (Lat. "lignum"=wood) such as, for example, wood, straw, hay, but also paper.

BACKGROUND

Fast pyrolysis serves to convert carbon-containing source materials such as biomass into a large amount of liquid pyrolysis condensate (pyrolysis oil) as well as a small amount of solid pyrolysis coke and pyrolysis gas. Fast pyrolysis is accomplished, in the context of the aforesaid biomass as source material, with oxygen excluded and within a few seconds, preferably in approximately one second, at approx. 400 to 600° C., preferably about 500° C.; what results is typically a 40 to 80 wt % proportion of biomass oil and only 10 to approx. 30 wt % biomass coke.

Fast pyrolysis (also called flash pyrolysis) is thus a special pyrolysis method in which a particularly large amount of liquid pyrolysis condensate, and little gas and coke, occur. Wood and straw (lignocellulose) in particular can be liquefied to biomass oil at a rate of over 40% to 80% (See E. Henrich, E. Dinjus, D. Maier: Flue gas gasification of liquid pyrolysis products at high pressure—a new concept for biomass gasification, DGMK conference: Biomass energy utilization, Velen, Apr. 22-24, 2002).

The heat requirement for fast pyrolysis is generally met by the combustion of pyrolysis cokes or pyrolysis gases, or a combination of the two. In a well-managed fast pyrolysis system, the calorific value of the pyrolysis gases (depending on the source material) is on the order of the requirement, i.e. in the range of about 10% of the biomass calorific value or even somewhat less. The calorific value of the coke component usually greatly exceeds the requirement (by a factor of more than two), so that only a portion is used.

Allothermic process management is typical for practically all fast pyrolysis methods. In methods that use a heat transfer medium, the latter is caused to circulate, since otherwise it is difficult to accommodate sufficient heat exchange area in the relatively small volume of the pyrolysis reactor. A second fluidized bed combustion reactor that is separated from the pyrolysis reactor on the gas side is usually installed in the heat transfer medium circuit; in this fluidized bed reactor, pyrolysis gas or usually a portion of the pyrolysis coke is combusted with air, and heats the heat transfer medium in controlled fashion directly in the fluidized bed. A number of problems can occur in this context, for example the handling of low-melting-point ash, potential risks of the formation of toxic chlorodioxins and -furans, incomplete CO combustion, etc.

Such problems can be avoided by indirect heating of the heat transfer medium from outside in a heat exchanger, albeit at the cost of greater technical complexity because of the limited heat transition coefficients.

In mechanically fluidized reactors such as, for example, screw reactors (e.g. double-screw mixing reactors), a heat transfer bed having particulate solids (grains) of a heat transfer medium is mechanically mixed and transferred. For this, a relatively fine-grained heat transfer medium that can be thoroughly radially mixed is used, because of its large specific surface, for efficient and fast transfer of a quantity of heat to the lignocellulose.

E. Henrich, E. Dinjus, D. Maier: Flue gas gasification of liquid pyrolysis products at high pressure—a new concept for biomass gasification, DGMK conference: Biomass energy utilization, Velen, Apr. 22-24, 2002 describes, by way of example, a facility and method for thermal treatment of materials. The facility encompasses a double-screw reactor having two conveyor screws arranged parallel to one another, rotating codirectionally, and engaging into one another, in which reactor a continuous biomass flow is heated for several seconds, with a continuous flow of sand or coke as heat transfer medium, to a temperature of about 500° C.

Alternatively, EP 1 354 172 B1 describes a single-screw reactor having a rotary oven with a reaction zone, in which zone a conveyor screw for transporting biomass and heat transfer particles is arranged. The heat transfer medium is constituted by balls of metal, ceramic, or silicon carbide (hard material).

When the aforesaid heat transfer particles, also including quartz sand and similar brittle material, are used in the usual fashion, a small amount of very fine abraded material is formed in the heat transfer circuit at each pass, and is discharged and separated along with the pyrolysis coke. The coke, too, is not immediately discharged completely at the first pass, but instead accumulates in the circulating heat transfer medium, especially when mechanical conveying is used, until an equilibrium value is reached. The presence of more coke can undesirably contribute to faster decomposition of the vapors on the catalytically active coke and ash surfaces, and thus reduce organic condensate yields.

SUMMARY

It is an aspect of the present invention to provide an improved method for fast pyrolysis of lignocellulose that, in particular, reduces the risk of undesired contamination of the pyrolysis condensate and pyrolysis coke with abraded material.

In an embodiment, the present invention provides a method for fast pyrolysis of lignocellulose. The method includes: mechanically comminuting the lignocellulose to lignocellulose particles; at least one of completely drying and preheating the lignocellulose particles; mixing the lignocellulose particles with heat transfer particles so as to provide a mixture; heating the heat transfer particles, prior to the mixing, to a temperature between 500° C. and 650° C.; and heating, in a pyrolysis reactor with oxygen excluded, the lignocellulose particles using the heat transfer particles so as to establish a temperature between 400° C. and 600° C. for 1 to 50 seconds and so as to react the lignocellulose particles so as to provide pyrolysis coke, pyrolysis condensate, and pyrolysis gas.

BRIEF DESCRIPTION OF THE DRAWINGS

Aspects of the present invention will now be described by way of exemplary embodiments with reference to the following drawings, in which.

DETAILED DESCRIPTION

Figure 1A:
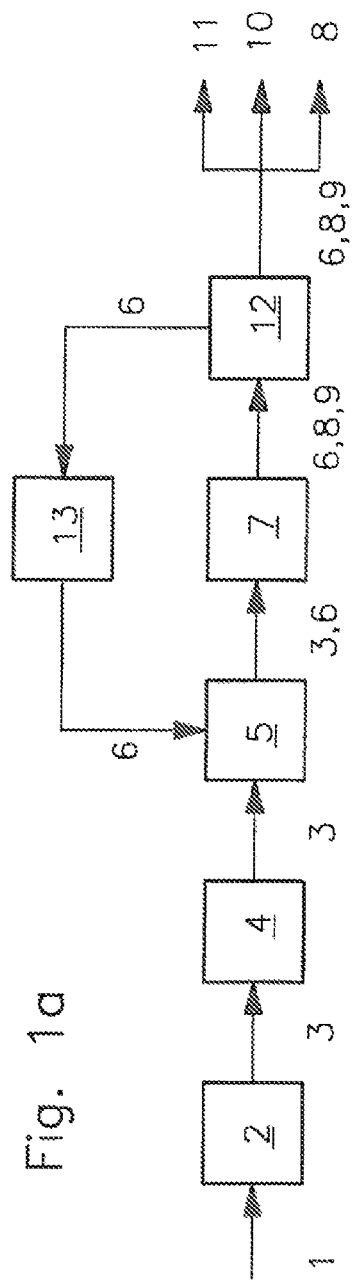
FIGS. 1a and b schematically show execution of the method for fast pyrolysis of lignocellulose according to an exemplary embodiment of the present invention.

A basic idea of the invention is not only to comminute the lignocellulose prior to introduction into the pyrolysis reactor, but to dry it completely in a heat treatment preceding pyrolysis, with the result that the quantity of heat required for evaporation no longer needs to be additionally applied in the context of fast pyrolysis. "Complete drying" encompasses, in the context of the invention, a removal of at least 99% of the free water component (i.e. that not bound in the lignocellulose). Because the heat of evaporation no longer needs to be applied in the context of fast pyrolysis, the quantity of heat to be transferred from the heat transfer particles to the lignocellulose particles during fast pyrolysis is also smaller. In particular, smaller heat transfer surfaces are now all that is required for the same lignocellulose heating rate, allowing in principle for larger heat transfer particles. Larger particles represent an enormous advantage in terms of simple handling, since once fast pyrolysis is complete they can be separated substantially more easily, by a sieving or vibratory process, from the finely particulate pyrolysis products, in particular the pyrolysis coke.

Preferably, however, the heat treatment also serves to preheat the biomass prior to introduction into the fast pyrolysis process, i.e. yields a further energy saving and better temperature management of the fast pyrolysis (smaller temperature difference and thus a further reduction in the quantity of heat required).

The aforesaid drying is preferably accomplished via simply a heat treatment under ambient pressure, but can also be assisted or replaced by a (preferably lower) pressure deviating therefrom or by a particularly dry atmosphere, i.e. one particularly unsaturated with water.

The conditions (pressure, temperature, atmosphere), in particular the temperature, of this heat treatment are based on the vapor pressures and the volatile constituents (water) to be removed, and decomposition conditions for the biomass to be pyrolyzed must not be reached. The heat treatment preferably takes place in non-pressurized fashion in air at a temperature (for process acceleration) above the boiling temperature of water (100° C.), by preference above 120° C. or 130° C., the upper limit being located, as a result of incipient decomposition, odor generation, and the ignition temperature of lignocellulose, at approx. 200° C., preferably 170 to 180° C. The preferred values include a buffer zone with respect to the other values, since heat transfer always occurs in the context of an aforesaid heat treatment of the lignocellulose particles, and local temperature fluctuations may be expected.

To avoid oxygen reactions or precombustion of the lignocellulose, drying is preferably performed with a low-oxygen gas such as a waste gas. The waste gas can be derived from a combustion process of pyrolysis gas, a portion (e.g. the lower-value portion) of the pyrolysis coke.

Upon drying and heating of the biomass (lignocellulose) prior to fast pyrolysis, the risks of decomposition and autoignition are very low, even in air, up to the preferred temperatures of approx. 170 to 180° C., and can in practice be ruled out. Odor generation also remains moderate, at least for most substances, and can be controlled. Without preheating, the quantity of heat necessary for preheating would need to be applied additionally in the fast pyrolysis reactor, necessitating correspondingly more complex and therefore more expensive process management, especially in the context of a time-limited reactor pass. This involves, most of all, increased heat transfer particle circulation (with respect to the biomass flow and thus the flow of heat) and greater heat input (higher heat transfer rates) at a higher temperature than during preheating, but also, alternatively, a lower throughput of lignocellulose to be pyrolyzed. With optimally selected operating parameters, throughput can be more than doubled for the same heat transfer medium circulation rate using a dry, preheated feed (biomass, lignocellulose). In experimental operation, increases by a factor of more than three were in fact observed, depending on the source material.

The heat treatment or drying can be accomplished before and/or after comminution of the lignocellulose; in principle, dewatering alone can also be performed in the context of extended dry storage at temperatures below the boiling temperature of water.

A highly preheated comminuted biomass (feed), in combination with a relatively coarse heat transfer medium, offers a number of advantages. A preheated feed drastically reduces the heat requirement during pyrolysis, since the free water in the biomass is already evaporated, and heating from room temperature to incipient decomposition at 180 to 200° C. accounts for about one-third of the perceptible heat required to reach the final pyrolysis temperature of about 500° C.

A decrease in heat consumption is additionally achieved by the fact that between about 270° and approximately 400° C., much of the pyrolytic conversion of lignocellulose in particular occurs exothermically, i.e. by self-heating. Advantageously, the heat produced exothermically no longer needs to be supplied from outside. The additional economy achieved in this fashion depends on the constitution (e.g. composition, specific surface, calorific value, etc.) of the lignocellulose to be pyrolyzed and on the pyrolysis conditions themselves, in particular on the heating rates and holding times of the fast pyrolysis process. For example, the more $CO_2$ and $CH_4$ present among the pyrolysis products, the more heat is developed.

When the lignocellulose particles are preheated to a temperature between 170 and 200° C., performance of fast pyrolysis requires the lignocellulose particles to be rapidly heated by only approx. 70 to 100° C. in order to reach the aforesaid temperature of 270° C. for starting the aforesaid exothermic reaction (further self-heating). The heat requirement for this pyrolysis section therefore need not necessarily be known.

The heat input necessary for heating the lignocellulose particles in a fast pyrolysis facility is advantageously reduced to a minimum by drying and preheating. This permits on the one hand a reduction in the quantity of heat transfer particles and thus in the absolute quantity of heat that is available, but also preferably allows, with no reduction in the absolute heat quantity, heat transfer particles having a small specific heat transfer surface that is less favorable for rapid heat transfer but is that much more favorable for separation of the pyrolysis products from the heat transfer particles, technical implementation preferably being achieved solely by enlarging the heat transfer particles.

Another idea of the invention is to reduce the aforesaid large specific surface of the heat transfer medium, which in principle is favorable for rapid heat transfer, in favor of a large accessible specific surface of the lignocellulose that is to be pyrolyzed. This means in practical terms that the heat transfer particles have a specific minimum size that is larger compared to sand, while simultaneously the lignocellulose is comminuted, preferably by shredding, sawing, grinding, and/or chopping, before delivery into the fast pyrolysis process, into small lignocellulose particles on the order of sawdust or chips, preferably a maximum of approx. 3 mm in size.

A high specific surface for the lignocellulose prepared in this fashion advantageously results in particularly rapid heating of the biomass to be pyrolyzed. Because the entire lignocellulose volume is well-connected to regions close to the surface, the entire biomass is moreover heated particularly homogeneously; this enables (advantageously for fast pyrolysis) controlled and exact temperature management, a particularly rapid change in the temperature of the biomass or pyrolysis products, and at the same time a more homogeneous pyrolysis of the pyrolysis condensate and pyrolysis coke, and also reduces the heat requirement in the fast pyrolysis reactor.

A reduced low heat requirement in the fast pyrolysis reactor can be transferred sufficiently rapidly even with a smaller area, in particular when the lignocellulose to be pyrolyzed permits the aforesaid rapid heat uptake and heat penetration. In such a case a coarser heat transfer medium having a preferred particle size greater than 3 mm, more preferably between 6 and 16 mm, is sufficient; this medium is notable for a higher heat capacity per unit surface, so that upon heat discharge to the lignocellulose it advantageously cools less quickly, and a more uniform temperature in the pyrolysis process can thus be expected.

To reduce the rub-off of abraded material (tribological wear of the particles), the heat transfer particles preferably have a rounded shape, by preference a spherical shape. Abraded material should be avoided during fast pyrolysis, since it preferentially accumulates in the pyrolysis coke and accelerates abrasive wear in the method steps downstream from fast pyrolysis, in particular in the nozzle arrangements of a flue gas gasifier or in the pump and valve arrangements for intermediate products (slurry) in the context of biomass gasification. A reduction in abraded material in the pyrolysis products therefore advantageously reduces this abrasive wear. A particular goal is to prevent the fuel nozzles in the flue gas gasifier from being rapidly worn away.

The heat transfer medium is preferably made up of an abrasion-resistant material having (sufficiently) good thermal conductivity, such as ceramic, SiC, or $Al_2O_3$, but also quartz, graphite, hard materials, or preferably a correspondingly suitable metal or an alloy such as, by preference, Inconel or Incoloy, which exhibit sufficient resistance to chlorine and hydrochloric acid. In a preferred embodiment, the heat transfer particles have a wear protection layer or a wear protection layer composite that comprise at least one layer made of a hard material or a hard metal. The particles themselves can then be employed materials having particularly favorable thermal properties, such as e.g. high thermal conductivity or heat capacity.

When the heat transfer materials have good thermal conductivity and temperature resistance, unquenched combustion gases can preferably be used directly to heat them, enabling further technical simplifications in the heat transfer circuit. Large particles furthermore reduce the flow resistance due to bulk filling with hot combustion gases during heating (less pressure loss). Furthermore, gas-side blockage of the reactor from the hot section in the context of heat transfer particle circulation is longer accomplished by long blockage sections as is the case with sand, but instead, advantageously, is preferably achieved by way of rotary or gear valves or comparable devices.

A further advantage of the aforesaid combination of large heat transfer particles and comminuted lignocellulose lies in the good separability between heat transfer particles and pyrolysis coke after fast pyrolysis. This is because a coarse-grained heat transfer medium (large heat transfer particles) permits or favors almost complete mechanical coke separation, for example by blowing out or via a sieve. If the heat transfer particles are furthermore low in or free of coke, i.e. low in fuel, they are particularly suitable for utilization cycles in fast pyrolysis encompassing, for example, external heating (preferably to a temperature between 500 and 650° C., preferably heated by direct contact with a hot combustion gas from combustion of, by preference, pyrolysis gas and/or pyrolysis coke with preheated air), return to the pyrolysis reactor for heat delivery, and another heating operation. Coke-free (or particularly low-coke) heat transfer particles permit, in particular, direct heating with the hot flue gas from the combustion of pyrolysis coke or pyrolysis gas with no expectation of major difficulties during heating, such as those known with pneumatic sand conveyance, resulting from accompanying (e.g. adhering) and entrained highly reactive pyrolysis coke residues that in some cases have a not inconsiderable heat of combustion value. Larger adhering pyrolysis coke residues produce, in particular, risks of coke combustion with ash release or with the formation of toxic chlorodioxins and -furans, involving special and usually expensive measures for reliable control of such substances.

Intermixing of the heat transfer particles and lignocellulose particles (biomass, feed) is preferably accomplished in the fast pyrolysis reactor and during mixing mechanically, for example by a rotary tube with inserts, a single screw, or co-directionally rotating and intermeshing double screws, or with the aid of gravitation, or by a combination of the two, for a dwell time from 1 to 100 seconds, preferably 3 to 30 seconds, in the fast pyrolysis reactor. The latter is preferably designed so that only a small portion of the pyrolysis coke is discharged with the pyrolysis gases and vapors, so that coke dust separation with a hot cyclone can be omitted.

After leaving the pyrolysis reactor, the coke dust entrained in the gas can never be completely held back. Based on our operating experience, deposits and conduit shifts with tar/coke smears are the most common and most serious operating difficulties with fast pyrolysis. Less coke dust in the gases and vapors greatly decreases this risk, and thus increases the reliability and availability of the equipment. In particular, the design of the condensate recovery system becomes simpler, and condensation proceeds more reliably.

The risk of conduit shifting due to the deposition of high-viscosity coke/tar smears downstream from the pyrolysis reactor is high, and elimination of them can drastically reduce the availability of the equipment. It has been found in experimental facilities that the discharge of pyrolysis coke powder from the pyrolysis reactor into the hot cyclone, and in part additionally into the condensate, can in some cases be considerably reduced (to less than 20%) by small physical modifications to change the gas velocity at the reactor output. Less coke mans that the troublesome smearing can be drastically decreased, and equipment availability can be kept correspondingly high.

In a preferred embodiment, the heat transfer particles (e.g. after previously being lifted in, for example, a bucket conveyor) are thoroughly mixed via turbulence with the lignocellulose particles utilizing kinetic energy, for example in an enclosed free-fall section prior to the actual fast pyrolysis reactor, so that a homogeneous mixture is already introduced into the actual pyrolysis reactor.

In a further embodiment, the pyrolysis gas recovered in fast pyrolysis is used to drive a gas motor (e.g. to drive a power generator), the hot, low-oxygen motor exhaust gases being usable to dry and heat the lignocellulose and/or the heat transfer particles. The hot gases from combustion of a portion of the pyrolysis coke can likewise be utilized for this purpose.

Possible execution diagrams for the method according to the invention are depicted in FIGS. 1a and b. FIG. 1a depicts a simple procedure, while FIG. 1b reproduces an optimized process alternative.

According to FIG. 1a, lignocellulose 1 is delivered in a first step as a material stream to a mechanical comminution step 2 and then, as lignocellulose particles 3, to a drying step 4. The lignocellulose particles, dried and preferably also preheated to 170 to 200° C., are then delivered to a mixing step 5 with heat transfer particles 6, then passing together through fast pyrolysis in a fast pyrolysis reactor 7. In the context of fast pyrolysis, material transport is preferably accomplished by way of one or more conveyor screws.

In the context of mixing and fast pyrolysis, the aforesaid very rapid heating of the preferably preheated lignocellulose particles occurs. This is accomplished by heat transfer from heat transfer particles 6, heated to above 350° C., preferably to 500 to 650° C., to the lignocellulose particles, preferably from a preheat temperature of between 170 and 200° C. to the aforesaid lower starting temperature for exothermic pyrolysis, which is approximately 270° C. (can vary between 150 and 300° C. depending on the reaction partners). Further heating of the lignocellulose particles to be pyrolyzed occurs in the context of fast pyrolysis-7, accelerated by the aforesaid exothermic process to a pyrolysis temperature preferably between 400 and 650° C.

Passage through fast pyrolysis in the reactor 7 takes place, with oxygen excluded, at the aforesaid temperature between 400 and 650° C., and lasts between one and 100 seconds, preferably between one and 10 seconds, more preferably between one and three seconds. In this context, lignocellulose particles 3 react to form pyrolysis coke 8 and pyrolysis condensate 9 (pyrolysis oil 10 and pyrolysis gas 11), which in the context of a material separation step 12 are quenched, i.e. cooled within 0.1 to 5 seconds, preferably between 0.1 and 1 second, to a temperature below 200° C., and are separated from heat transfer particles 6 preferably in a vibrating sieve. Quenching also causes a separation of pyrolysis condensate 9 into condensed liquid pyrolysis oil 10 and a gaseous component, pyrolysis gas 11. Whereas pyrolysis coke 8, pyrolysis oil 10, and pyrolysis gas 11 are sent on for further processing, the heat transfer particles experience, in the context of a material circuit, heating 13 to aforementioned temperatures and are returned back into the aforesaid mixing step 5.

Figure 1B:
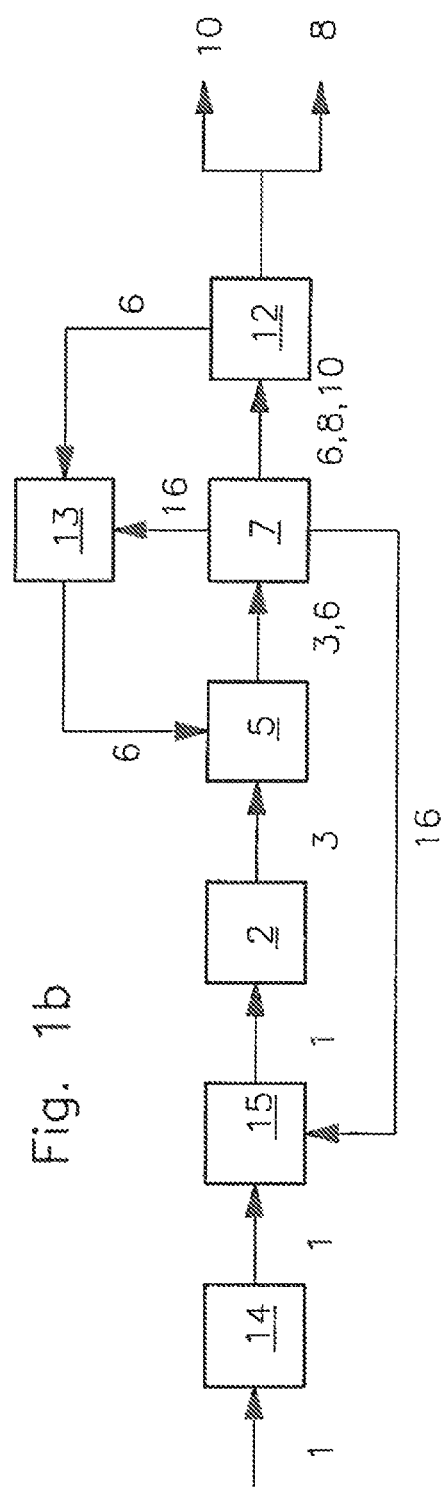

According to the variant method shown in FIG. 1b, the lignocellulose, dried by storage 14, is delivered to a step of preheating 15 to approximately 170 to 200° C. Only thereafter, i.e. immediately before delivery of the lignocellulose into mixing step 5 and fast pyrolysis in the reactor 7, does comminution 2 into lignocellulose particles 3 take place.

The particular advantage of later comminution lies in process reliability. This is because the specific surface and thus elevated reactivity of the lignocellulose is accomplished only just before fast pyrolysis, i.e. only a small time window remains available for the premature reactions, such as ignition or decomposition, associated with elevated reactivity and to be expected in the context of preheating. In addition, the comminution process step can be integrated into the particularly low-oxygen atmosphere of the material flow that is necessary for fast pyrolysis. This is also usable for a moderate elevation of the preheating temperature to temperatures between 190 and 220° C., preferably between 190° C. and 200° C., in the context of preheating 15.

Alternatively, preheating 15 and comminution 2 are performed in one combined process step, which likewise allows a reduction of the time window for the aforesaid premature reactions.

A preliminary separation of the gaseous pyrolysis products 16, preferably of pyrolysis gas 11 and of other gaseous pyrolysis products occurring at the aforesaid fast pyrolysis temperature, occurs during fast pyrolysis. These products are then conveyed to a combustion system, the heat of combustion being usable, directly or via the exhaust gases, for energy delivery for heating 13 and preheating 15, but also optionally for drying 2 (energy delivery not depicted here). The particular advantage of exhaust gases is furthermore their lack of free oxygen molecules, which is also favorable for their use for temperature control in the context of fast pyrolysis.

Figure 2:
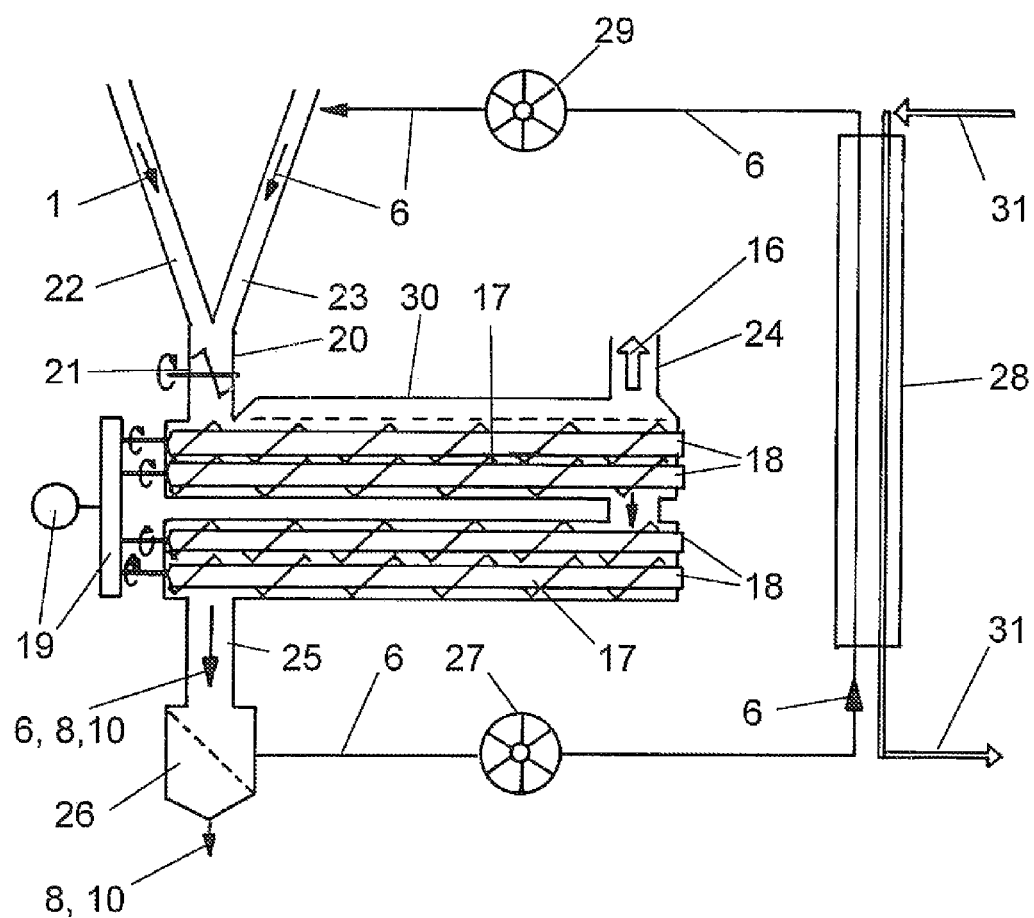
FIG. 2 shows an configuration of an apparatus for fast pyrolysis of lignocellulose according to an exemplary embodiment of the present invention.

An exemplifying configuration of an apparatus for carrying out the aforesaid method for fast pyrolysis of lignocellulose is shown in FIG. 2. A central element of the apparatus is pyrolysis reactor 17 (mixing reactor) having two double screws 18 connected one behind another and driven via a geared motor 19, each having two conveyor screws that are arranged parallel to one another, rotate codirectionally, and engage into one another, to carry out the fast pyrolysis. Upstream from the pyrolysis reactor is a premixing chamber 20, optionally having a replaceable mechanical mixer 21 as well as respective supply lines 22, 23 for the preheated lignocellulose particles (22) and heat transfer particles (23). Optionally, the premixing chamber can also be a vertically longer free-fall section.

The pyrolysis reactor additionally comprises: a gas outlet 24 for gaseous pyrolysis products 16 (pyrolysis gases and pyrolysis vapors, also including coke dust) at one point, preferably at a point centeredly located higher than the surrounding interior volume of the reactor; if applicable a dome 30 that, as a gas collection volume, spans a large area of the upper part of the pyrolysis reactor; and, at the end of the fast pyrolysis section constituted by double screws 18, a common outlet 25 for heat transfer particles 6, pyrolysis coke 8, and pyrolysis oil 10, having a downstream separation chamber 26 (e.g. vibratory sieve). In the separation chamber, in the context of the aforesaid material separation, a separation occurs of the low-coke heat transfer particles 6, which are then conveyed, at approx. 400 to 500° C., through a first rotary valve 27 (fluid and gas barrier) to a countercurrent heat exchanger 28, heated there to approx. 500 to 600° C., and after passing through a second rotary valve 29 (fluid and gas barrier) are conveyed into the aforesaid premixing chamber. The countercurrent heat exchanger is preferably supplied and thereby temperature-controlled via a hot flue-gas stream 31 from a thermal machine fired by gaseous pyrolysis products 16.

The invention claimed is:

1. A method for fast pyrolysis of lignocellulose, comprising;
  a) mechanically comminuting the lignocellulose to lignocellulose particles while preheating the lignocellulose particles to a range of 170 to 200° C. under a low oxygen environment;
  b) mixing the lignocellulose particles with heat transfer particles after the mechanical comminuting and preheating so as to provide a mixture, the heat transfer particles including grains of at least one of metal, ceramic and hard material, the grains having a diameter greater than 3 mm;
  c) introducing the heat transfer particles, at a temperature in a range of 400° C. to 500° C. to a heat exchanger and heating the heat transfer particles, prior to the mixing, to a temperature between 500° C. and 650° C.; and d) heating, in a pyrolysis reactor with oxygen excluded, the lignocellulose particles using the heat transfer particles so as to establish a temperature between 400° C. and 600° C. for 1 to 50 seconds and so as to react the lignocellulose particles so as to provide pyrolysis coke, pyrolysis condensate, and pyrolysis gas.

2. The method according to claim 1, further comprising separating the heat transfer particles and pyrolysis coke by a sieving process.

3. The method according to claim 1, wherein the method is a continuous method and the heating of the heat transfer particles is carried out in the material circuit outside of, and separated on a gas side from, the pyrolysis reactor,
further comprising distributing the lignocellulose once as a continuous material stream and distributing the heat transfer particles repeatedly as a recycling material circuit.

4. The method according to claim 3, wherein the heating of the heat transfer particles includes contacting the heat transfer particles with a hot combustion gas of a combustion process.

5. The method according to claim 4, wherein the combustion process includes combusting at least one of pyrolysis gas and pyrolysis coke with preheated air.

6. The method according to claim 1, further comprising combusting at least one of the pyrolysis gas, a portion of the pyrolysis coke and a lower quality portion of the pyrolysis coke in a combustion process so as to provide low-oxygen exhaust gas, and wherein the preheating is performed using the low-oxygen exhaust gas.

7. The method according to claim 1, wherein the heat transfer particles are spheres that include at least one of Inconel, Incoloy and another HCl-resistant alloy.

8. The method according to claim 1, wherein the heat transfer particles are coated with a wear protection layer or with a wear protection layer composite, including at least one layer of a hard material or a hard metal.

9. The method according to claim 1, further comprising performing the mixing in free fall and before a receiving of the mixture into the pyrolysis reactor.

10. The method according to claim 1, wherein the mechanically comminuting the lignocellulose while preheating the lignocellulose particles is performed so as to remove at least 99% of the free water component of the lignocellulose.

11. The method according to claim 1, wherein the heat transfer particles comprise an HCl-resistant alloy.

12. The method according to claim 1, wherein the heat transfer particles comprise Inconel.

13. The method according to claim 1, wherein the heat transfer particles comprise Incoloy.

14. The method according to claim 1, wherein the heat transfer particles are coated with a wear protection layer comprising a harder material than underlying components of the heat transfer particle.

15. The method according to claim 1, wherein the heat transfer particles comprise a ceramic.

16. The method according to claim 1, wherein the heat transfer particles comprise SiC.

17. The method according to claim 1, wherein the heat transfer particles comprise $Al_2O_3$.

18. The method according to claim 1, wherein the heat transfer particles comprise quartz.

19. The method according to claim 1, wherein the heat transfer particles comprise graphite.

20. The method according to claim 1, wherein a dwell time in d) at between 400° C. and 600° C. is 3 to 30 seconds.

* * * * *